United States Patent [19]
Ueno et al.

[11] Patent Number: 5,280,868
[45] Date of Patent: Jan. 25, 1994

[54] RESERVOIR SUPPORTING STRUCTURE

[75] Inventors: Hiroshi Ueno, Osaka; Hirokazu Arai, Nara; Yoshiaki Hamasaki, Nara; Akihiko Shiina, Nara, all of Japan

[73] Assignee: Koyo Seiko Co., Ltd., Osaka, Japan

[21] Appl. No.: 958,145

[22] Filed: Oct. 8, 1992

[30] Foreign Application Priority Data

Oct. 17, 1991 [JP] Japan .............................. 3-93046[U]
Mar. 19, 1992 [JP] Japan .............................. 4-23493[U]

[51] Int. Cl.$^5$ .............................................. A47B 96/06
[52] U.S. Cl. ................................... 248/205.1; 180/79
[58] Field of Search ................... 248/311.2, 637, 200, 248/205.1, 220.2; 220/137; 180/79.1, 79

[56] References Cited

U.S. PATENT DOCUMENTS

| | | | |
|---|---|---|---|
| 3,212,661 | 10/1965 | Adell | 215/1 |
| 4,377,933 | 3/1983 | Lojou | 248/580 X |
| 4,424,829 | 1/1984 | Millington et al. | 137/590 |
| 4,829,850 | 5/1989 | Soloy | 248/554 X |
| 4,997,169 | 3/1991 | Nakamura et al. | 248/562 X |

FOREIGN PATENT DOCUMENTS

| | | |
|---|---|---|
| 58-12850 | 1/1983 | Japan . |
| 63-3955 | 2/1988 | Japan . |
| 1447396 | 8/1976 | United Kingdom . |
| 2049403 | 12/1980 | United Kingdom . |

Primary Examiner—Ramon O. Ramirez
Attorney, Agent, or Firm—Mason. Fenwick & Lawrence

[57] ABSTRACT

A structure in which a reservoir is supported by a bracket. The bracket has a side plate facing the external circumference of the reservoir and a bottom plate facing the bottom of the reservoir. An insert fitting portion formed onto the reservoir is fitted from above into a receiver fitting portion formed onto the side plate. A lock member is supported by the side plate like a cantilever at the upper edge of an opening formed on the side plate. A catch portion formed on the reservoir forces the lock member to displace elastically so that the lock member recedes from the reservoir in the course of fitting of the insert fitting portion into the receiver fitting portion. The side plate is elastically deformable in company with the elastic displacement of the lock member. When the fitting operation is completed, the lock member comes close to the reservoir to recover its original position and is placed on the top of the catch portion to prevent the upward dismount of the reservoir out of the bracket. An auxiliary receiver fitting portion is formed onto the bottom plate, and an auxiliary insert fitting portion is formed onto the reservoir, and thus, the reservoir is supported by the bracket at two support areas.

20 Claims, 29 Drawing Sheets

RESERVOIR SUPPORTING STRUCTURE

FIELD OF THE INVENTION

The present invention relates to a reservoir supporting structure suitable for supporting a reservoir which needs to be dismountable and is subjected to vibrations, for example, an oil tank of a hydraulic power steering device.

DESCRIPTION OF THE RELATED ART

The oil tank for a hydraulic power steering device must be occasionally dismounted out of a vehicle body for maintenance and service purposes. Thereby the oil tank is supported by a bracket which is installed onto the vehicle body, wherein a pair of receiver fitting portions are formed onto the bracket and a pair of insert fitting portions re formed onto the oil tank, and the insert fitting portions are fitted into the receiver fitting portions from above. To dismount the oil tank out of the bracket, the oil tank is pulled upward. To prevent upward accidental dismount of the oil tank, a lock member is formed onto the bracket and a catch portion is formed onto the oil tank. The lock member is elastically displaceable so as to recede from the oil tank. In the course of fitting of the insert fitting portions into the receiver fitting portions, the catch portion forces the lock member to displace elastically so that the lock member recedes from the oil tank. When the fitting operation is completed, the lock member comes close to the oil tank to recover its original position and is placed on the top of the catch portion to prevent the upward accidental dismount of the oil tank out of the bracket (Refer to Japanese Examined Utility Model Publication SHO No. 63-3955).

In the above described prior art structure, however, the bracket is of a high rigidity type. Therefore, when the lock member is elastically displaced, the bracket fails to deform, and thus stress acts on the border area between the lock member and the bracket locally, leading to a brakage at the border area.

Also, in the above described prior art structure, the bracket supporting the oil tank has a side plate facing the circumference of the oil tank, and the receiver fitting portions are formed onto the side plate, and the side plate is fixed onto a vertical wall portion of the vehicle body. Thereby, the bracket of the prior art structure cannot be installed onto a horizontal wall portion of the vehicle body. As a countermeasure it may be contrived to adopt a bracket which has a side plate and a bottom plate which faces the bottom of an oil tank, to fix the bottom plate onto the horizontal wall portion of the vehicle body. In the prior art structure, however, since the oil tank is cantilever-supported by the side plate, i.e., the oil tank is supported at a single area, the free end of the oil tank suffers vertical vibrations when the vehicle is subjected to vibrations. Thus, the bottom of the oil tank bumps against the bottom plate of the bracket, causing noise. Also, such bumps displace the bottom plate of the bracket relative to the side plate of the bracket, and cracks develop at the border portion between the side plate and the bottom plate as a result of stress acting on the border area, thereby leading to a breakage of the bracket.

It is an object of the present invention to provide a reservoir supporting structure which solve the above described problems.

SUMMARY OF THE INVENTION

The reservoir supporting structure according to the present invention comprises a bracket which supports a reservoir, the bracket having a side plate which faces the external circumference of the reservoir, a receiver fitting portion which is formed onto the side plate, an insert fitting portion which is formed onto the reservoir, the reservoir being supported by the bracket by fitting of the insert fitting portion from above into the receiver fitting portion, an opening which is formed on the side plate, a lock member which is supported like a cantilever by the side plate at the upper edge of the opening, the lock member being elastically displaceable so as to be able to recede from the reservoir, a catch portion which is formed onto the reservoir, the catch portion forcing the lock member to displace elastically so that the lock member recedes from the reservoir in the course of fitting of the insert fitting portion into the receiver fitting portion, the side plate being elastically deformable in company with the elastic displacement of the lock member, wherein the lock member comes close to the reservoir to recover its original position and is placed on the top of the catch portion to prevent the upward accidental dismount of the reservoir out of the bracket when the fitting operation is completed.

According to the structure of the present invention, when the catch portion forces the lock member to displace elastically so that the lock member recedes from the reservoir, the side plate elastically deforms accordingly. Thus, unlike the prior art structure in which the side plate is unable to deform, stress acting on the border area between the lock member and the side plate is reduced, and a breakage at the border area is prevented. Since the lock member is supported like a cantilever by the side plate at the upper edge of the opening formed on the side plate, the side plate deform easily by enlarging the opening or by widening the width of the border area between the lock member and the side plate. Namely, it is easy to reduce stress acting on the border area between the lock member and the side plate.

Preferably, a spacing is defined between the side edge of the opening formed on the side plate and the lock member so as to receive a tool for pulling the lock member away from the reservoir. Such an arrangement facilitates the pulling of the lock member off the reservoir when the reservoir is dismounted out of the bracket. Namely, the dismounting operation of the reservoir is readily achieved.

Also, the reservoir supporting structure according to the present invention comprises a bracket which supports a reservoir, the bracket having a side plate which faces the external circumference of the reservoir and a bottom plate which faces the bottom of the reservoir, a receiver fitting portion which is formed onto the side plate, an insert fitting portion which is formed onto the reservoir, the reservoir being supported by the bracket by fitting of the insert fitting portion from above into the receiver fitting portion, an auxiliary receiver fitting portion which is formed onto the bottom plate, an auxiliary insert fitting portion which is formed onto the reservoir, the auxiliary insert fitting portion being fitted from above into the auxiliary receiver fitting portion, wherein the upward accidental release of the auxiliary insert fitting portion out of the auxiliary receiver fitting portion is preventable when the fitting operation is completed.

According to the structure of the present invention, the reservoir is supported by the bracket at two areas. Namely, at one support area the insert fitting portion fits into the receiver fitting portion, and at the other support area the auxiliary insert fitting portion fits into the auxiliary receiver fitting portion. Since one support area is located on the side plate and the other support area is located on the bottom plate, relative vibration of the reservoir with respect to the bottom plate is preventable. Thereby, noise arising from bumps between the bottom plate of the bracket and the bottom of the reservoir is preventable. Also, even when the bracket is subjected to vibrations, no relative displacement takes place between the side plate and the bottom plate, no stress acts on the border area between the side plate and the bottom plate, and thus, the bracket is prevented from breakage Also, by putting the reservoir from above into the bracket, the reservoir is supported at the two support areas. Thus, the mounting operation of the reservoir is readily achieved.

Preferably the reservoir is a fluid tank with a pipe projected from the circumference of the fluid tank for allowing a fluid to pass through, and the pipe is used as the auxiliary insert fitting portion. This arrangement eliminates the need for the forming of a particular auxiliary insert fitting portion, simplifying the support structure and reducing the cost of fabrication.

Preferably, the angle between the inner surface of the side plate and the top surface of the bottom plate is smaller than the angle between the external circumference of the reservoir and the bottom surface of the reservoir. This arrangement causes the top surface of the bottom plate to be pressed against the bottom of the reservoir mounted on the bracket, effectively preventing the relative vibration of the reservoir with respect to the bottom plate.

Preferably, the bracket is of synthetic plastic material, and is fabricated inside a combination mold of a stationary mold and a single movable mold. This simplifies the structure of molds for the reservoir, reducing the cost required for molds.

DETAILED DESCRIPTION OF THE PREFERRED EMBODIMENTS

Figure 9:
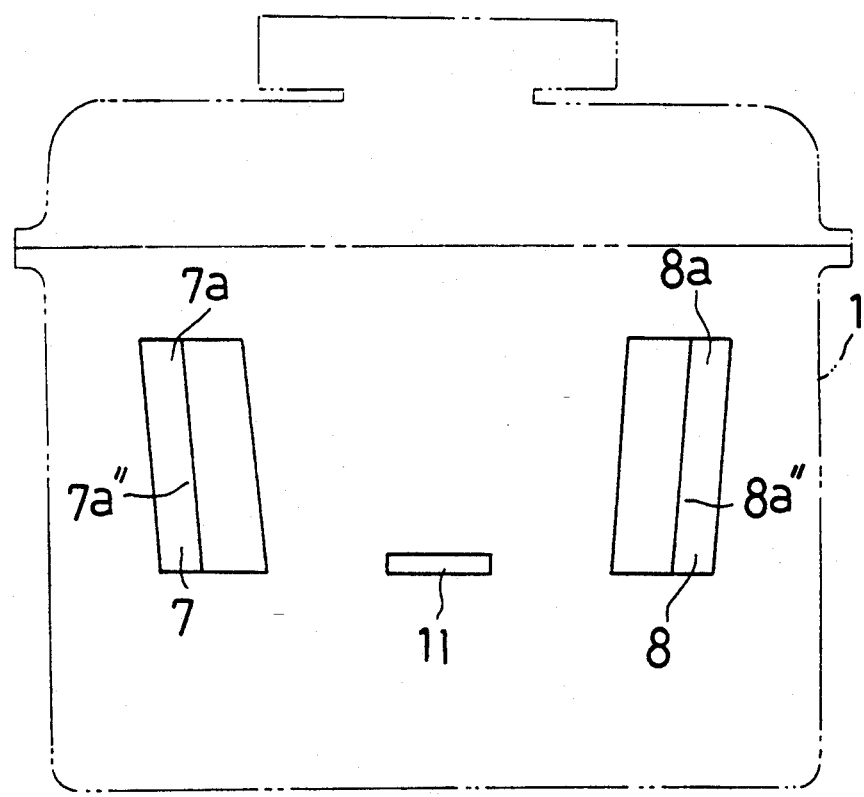
FIG. 9 is a side view of the reservoir of the embodiment according to the present invention.
Figure 10:
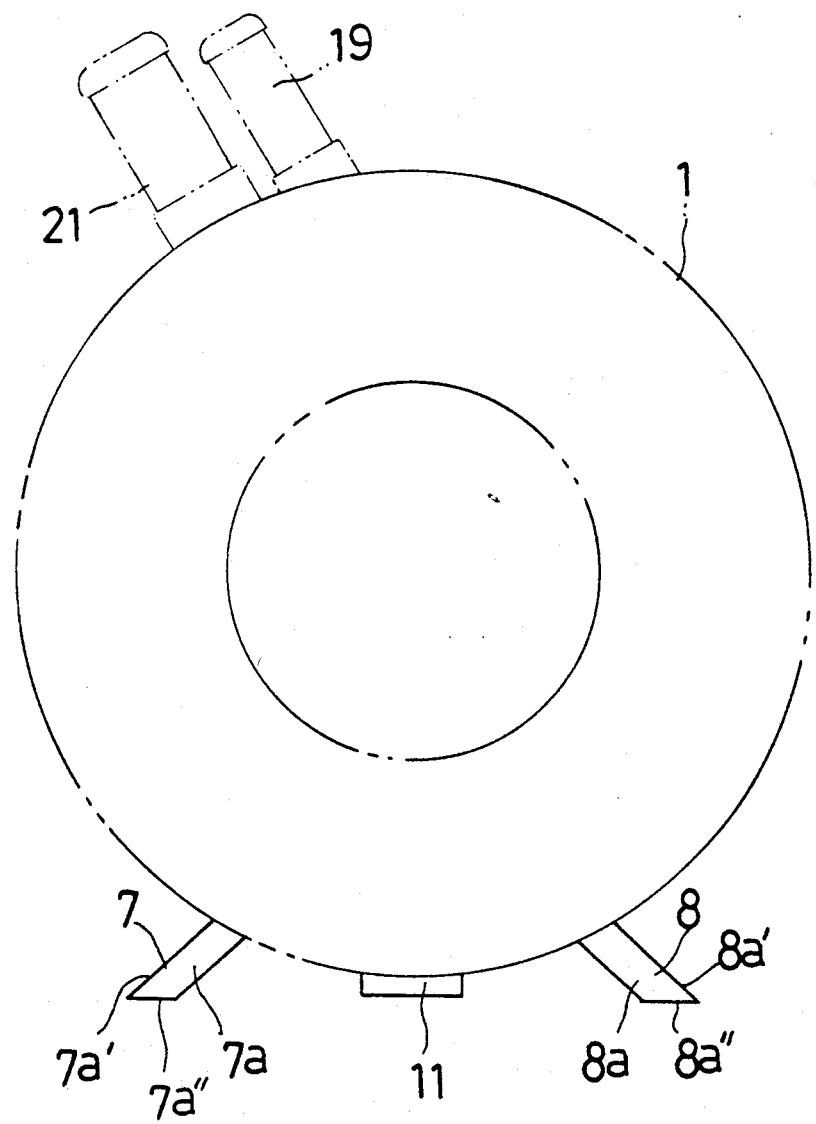
FIG. 10 is a plan view of the reservoir of the embodiment according to the present invention.

Both FIG. 9 and FIG. 10 show an oil tank 1 for a hydraulic power steering device, most of the oil tank 1 is made of synthetic resin. The oil tank 1 is supported by a bracket 2 shown in FIG. 1~FIG. 6 on a vehicle body. Both an oil inlet pipe 19 forming an oil inlet and an oil outlet pipe 21 forming an oil outlet are projected from the circumference of the oil tank 1. The oil tank 1 is connected to the hydraulic power steering device by means of hoses connected to the oil inlet pipe 19 and the oil outlet pipe 21.

The bracket 2 is of synthetic resin material and is an integrally molded one. This bracket 2 has a side plate 3 facing the external circumference of the oil tank 1 and a bottom plate 4 facing the bottom of the oil tank 1.

Figure 2:
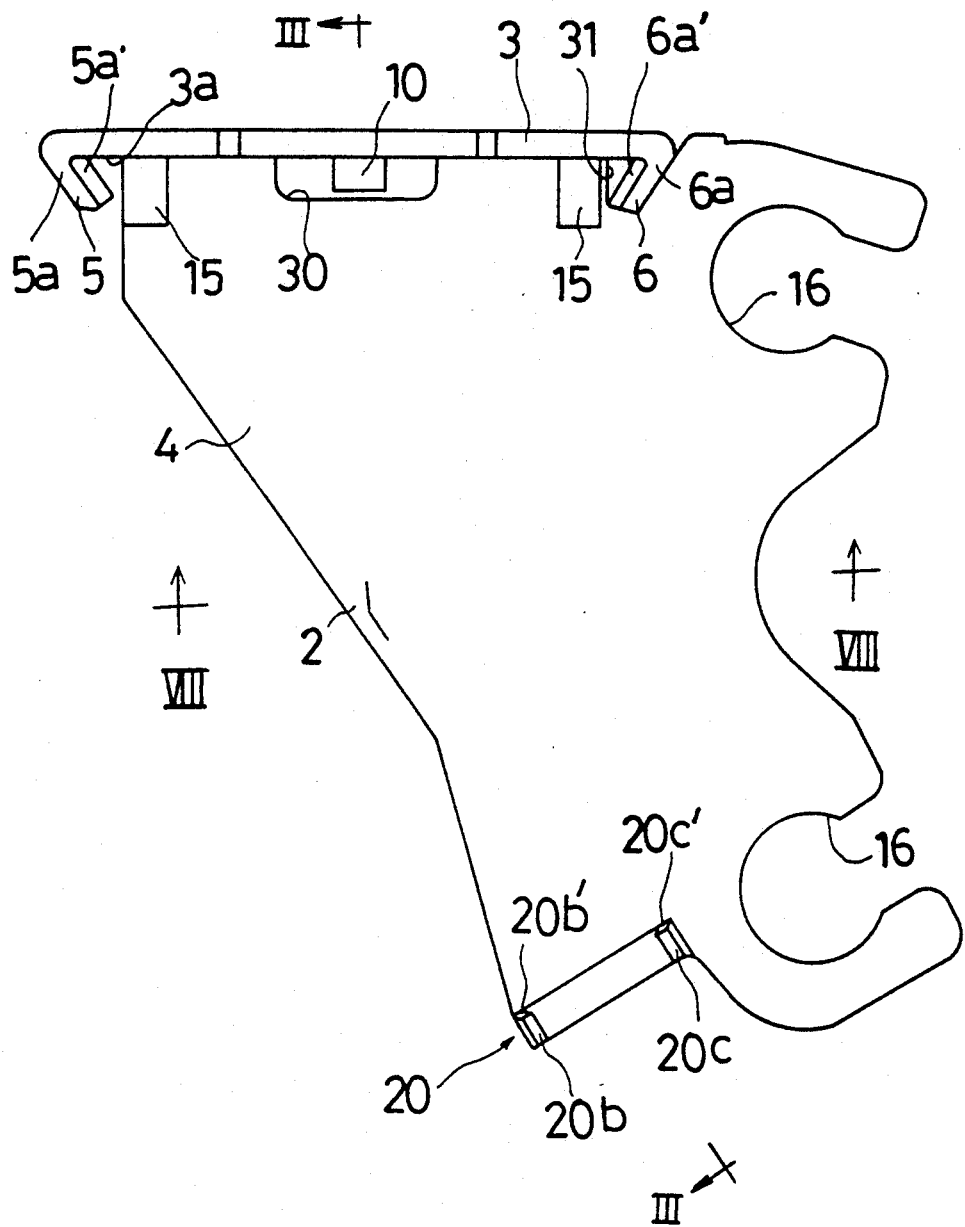
FIG. 2 is a plan view showing the bracket of the first embodiment according to the present invention.
Figure 6:
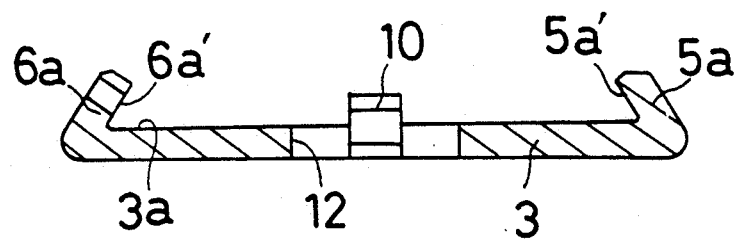
FIG. 6 is a cross-sectional view taken along line VI—VI in FIG. 1.

A pair of receiver fitting portions 5, 6 are formed onto the side plate 3. A pair of insert fitting portions 7, 8 are formed onto the external circumference of the oil tank 1. The insert fitting portions 7, 8 are fitted from above into the receiver fitting portions 5, 6. As shown in FIG. 2 and FIG. 6, the receiver fitting portions 5, 6 have respectively support members 5a, 6a which project toward the oil tank 1 from the side edges of the side plate 3. The inner faces 5a', 6a' of the support members 5a, 6a are inclined off the vertical so that the inner faces 5a', 6a' gradually narrow their mutual distance as getting near to the oil tank and as getting near to their bottom ends. As shown in FIG. 9 and FIG. 10, the insert fitting portions 7, 8 have respectively rail members 7a, 8a which project toward the side plate 3 from the external circumference of the oil tank 1. The outer faces 7a', 8a' of the rail members 7a, 8a are inclined off the vertical in accordance with the inclination of the inner faces 5a', 6a' of the support members 5a, 6a. When the rail members 7a, 8a are inserted between the support members 5a, 6a from above, the inner faces 5a', 6a' of the support members 5a, 6a and an inner face 3a of the side plate 3 respectively receive the outer faces 7a', 8a' and end faces 7a'', 8a'' of the rail members 7a, 8a. Thereby, the oil tank 1 is supported by the bracket 2.

To prevent the oil tank 1 from accidental dismount out of the bracket 2, in other words, to prevent the insert fitting portions 7, 8 from accidental release from the receiver fitting portions 5, 6, a lock member 10 is formed onto the bracket 2 and a catch portion 11 is formed onto the oil tank 1.

Figure 1:
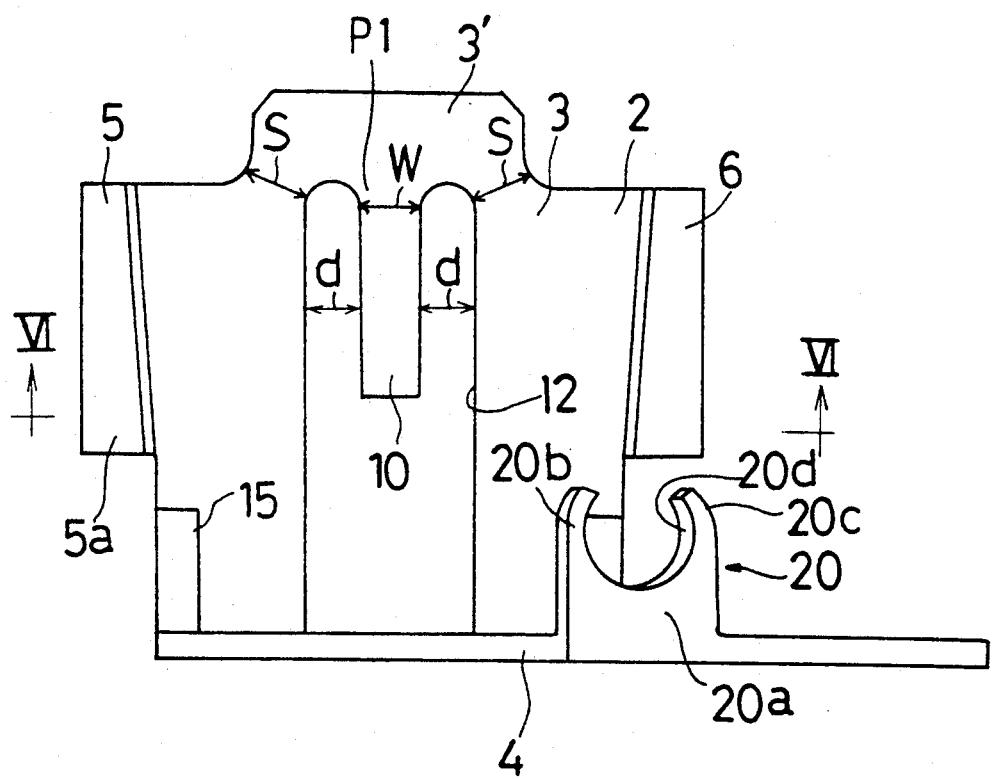
FIG. 1 is a side view showing the bracket of the first embodiment according to the present invention.

To be more precise, as shown in FIG. 1, an opening 12 is formed in the middle between the receiver fitting portions 5, 6 on the side plate 3. The lock member 10 like a rectangular plate is integrally formed with the side plate 3 to be located inside the opening 12, and the top end of the lock member 10 joins with the side plate 3 at the upper edge of the opening 12. Thereby, the lock member 10 is supported like a cantilever by the side plate 3, and is elastically displaceable so as to be able to recede from the oil tank 1 (toward the right in FIG. 3). The lock member 10 is inclined off the vertical so that it gradually comes close to the oil tank 1 as getting near to its bottom end.

Figure 3:
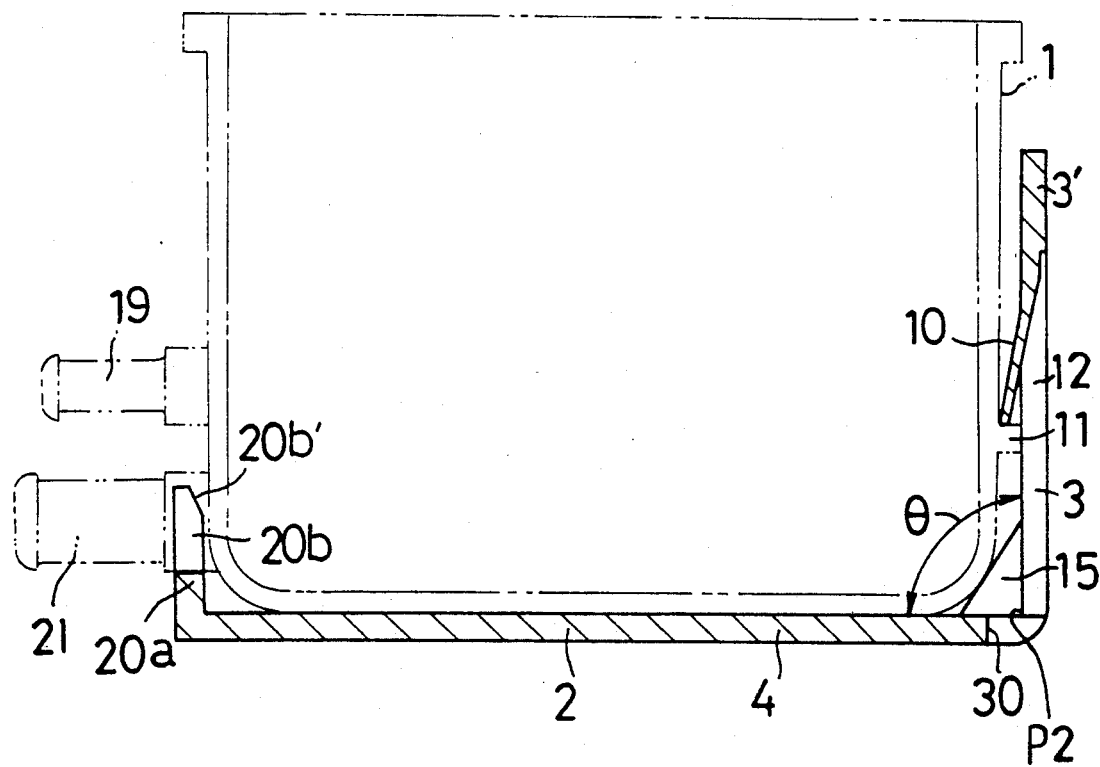
FIG. 3 is a cross-sectional view taken along line III—III in FIG. 2.
Figure 4:
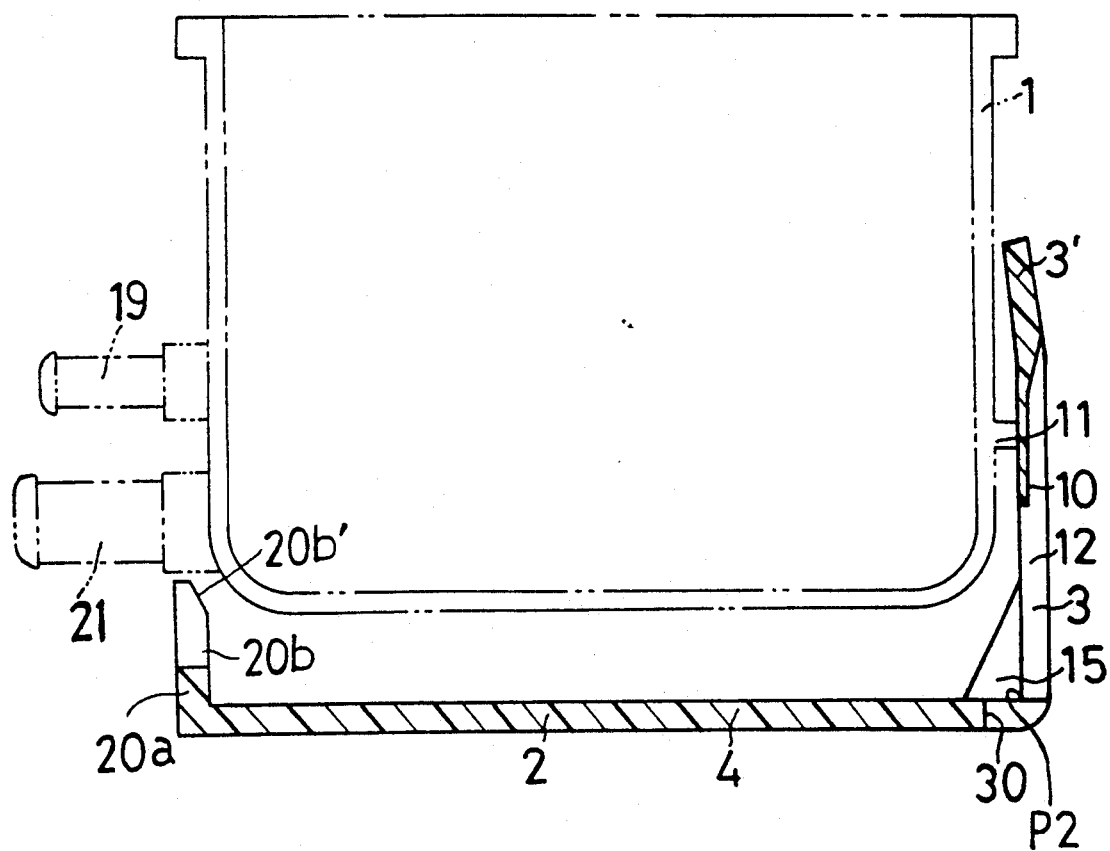
FIG. 4 is a cross-sectional view showing the function of the first embodiment of the present invention.

As shown in FIG. 9 and FIG. 10, the catch portion 11 like a block formed onto the oil tank 1 is arranged in the middle between the insert fitting portions 7, 8, and projects toward the side plate 3 from the external circumference of the oil tank 1. As shown in FIG. 4, the catch portion 11 forces the lock member 10 to displace elastically so that the lock member 10 recedes from the oil tank 1 in the course of fitting of the insert fitting portions 7, 8 into the receiver fitting portions 5, 6. As shown in FIG.3, when the insert fitting portions 7, 8 are completely mated with the receiver fitting portion 5, 6, the lock member 10 comes close to the oil tank 1 so as to recover its original position, and the catch portion 11 is placed below the lock member 10. Thereby, the bottom end of the lock member 10 is received by the top of the catch portion 11, and the upward accidental dismount of the oil tank 1 out of the bracket 2 is prevented.

As shown in FIG. 4, in the course of fitting of the insert fitting portions 7, 8 into the receiver fitting portions 5, 6, the upper portion 3' of the side plate 3 elastically deforms so as to come close to the oil tank 1 in company with the elastic displacement of the lock member 10 which recedes from the oil tank 1. The stress which acts on the border area P1 (shown in FIG. 1) between the lock member 10 and the side plate 3 is reduced by the elastic deformation of the upper portion 3' of the side plate 3, in contrast to the case in which no elastic deformation of the side plate takes place. As shown in FIG.1, the more the distance S between the inner edges of the opening 12 and the outer edges of the side plate 3 narrows, the more the elastic deformation of the upper portion 3' of the side plate 3 increases. Also, the more the width W of the border area P1 between the lock member 10 and the side plate 3 widens, the more the elastic deformation of the upper portion 3' of the side plate 3 increases. Namely, the design of the side plate 3 for reducing stress acting on the border area P1 between the lock member 10 and the side plate 3 is easy, thereby to prevent breakage at the border area P1 is easily achieved.

Figure 7:
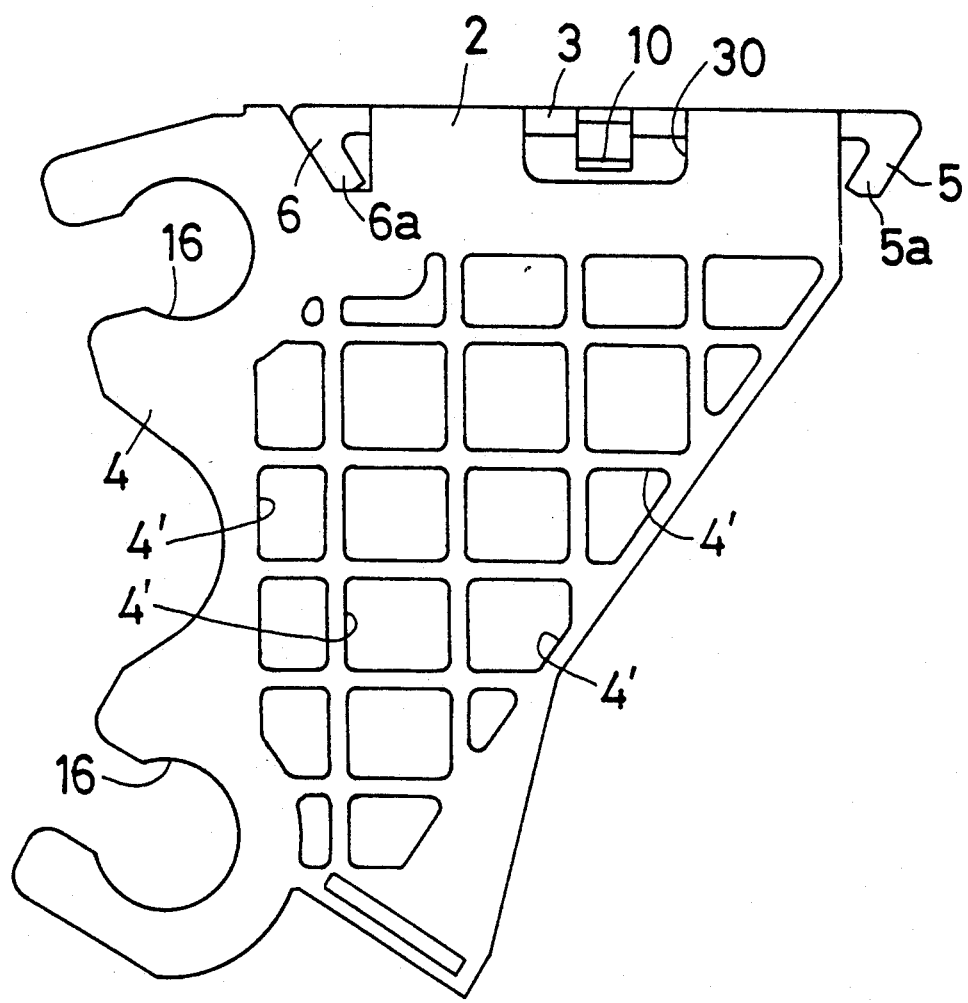
FIG. 7 is a bottom view of the bracket of the first embodiment according to the present invention.

As shown in FIG. 2 and FIG. 7, the bottom plate 4 of the bracket 2 has holes 16, and the bracket 2 is fitted to the vehicle body by bolts which go through the holes 16. An auxiliary receiver fitting portion 20 facing the external circumference of the oil tank 1 is formed onto the bottom plate 4. An auxiliary insert fitting portion 21 formed onto the oil tank 1 is fitted into the auxiliary receiver fitting portion 20. In this embodiment, the oil outlet pipe 21 is the auxiliary insert fitting portion.

Figure 5:
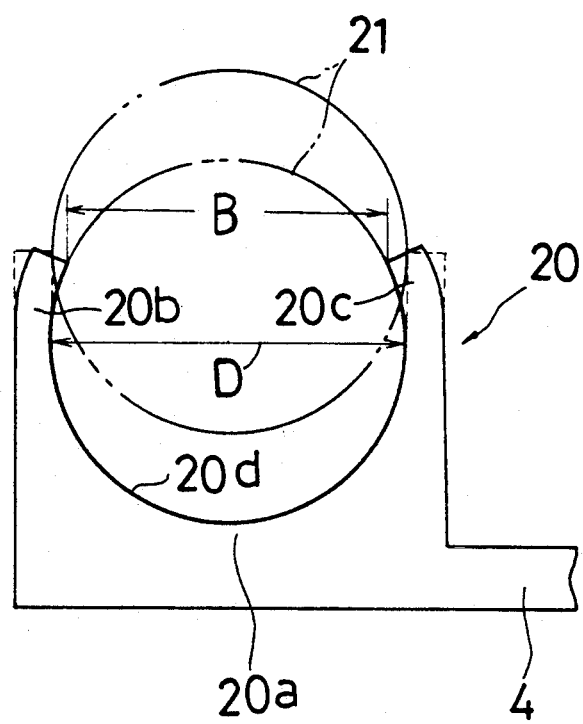
FIG. 5 is a front view showing the auxiliary fitting portion of the first embodiment according to the present invention.

To be more precise, the auxiliary receiver fitting portion 20 has a base 20a which is projected upwardly from the bottom plate 4 and a pair of arms 20b, 20c which are projected upwardly from the side edges of the base 20a. The inner face 20d of the base 20a and arms 20b, 20c has a shape of a major arc which fits on the external circumference of the oil outlet pipe 21. As shown in FIG. 5, the length of the inner face 20d in the shape of major arc is greater than half of the external circumference of the oil outlet pipe 21, and the distance B between the top ends of the arms 20b, 20c is smaller than the diameter D of the oil outlet pipe 21. Thereby, in the course of fitting of the oil outlet pipe 21 from above into between the arms 20b, 20c, as shown by broken line in FIG. 5, the oil outlet pipe 21 forces the both arms 20b, 20c to displace elastically so that the both arms 20b, 20c recede from each other. When the oil outlet pipe 21 completely fitted into between the both arms 20b, 20c, the both arms 20b, 20c come close to each other to return to their original positions. By the fitting, the external circumference of the oil outlet pipe 21 is received by the inner face 20d in the shape of major arc, and thus, the upward accidental release of the oil outlet pipe 21 out of the bracket 2 is prevented by the both arms 20b, 20c. Thereby, the oil tank 1 is supported by the bracket 2 at two areas, at one support area the insert fitting portions 7, 8 fit into the receiver fitting portions 5, 6 formed onto the side plate 3, and at the other support area the auxiliary insert fitting portion 21 fits into the auxiliary receiver fitting portion 20 formed onto the bottom plate 4. By the structure, relative vibration of the oil tank 1 with respect to the bottom plate 4 is prevented, and thus noise arising from bumps between the bottom plate 4 of the bracket 2 and the bottom of the oil tank 1 is prevented. Furthermore, since relative displace between the side plate 3 and the bottom plate 4 is prevented, no large stress acts on the border area P2 between the side plate 3 and the bottom plate 4, and thus, the breakage of the bracket 2 is prevented. Furthermore, by putting the oil tank 1 from above into the bracket 2, the insert fitting portions 7, 8 are fitted into the receiver fitting portions 5, 6 and the oil outlet pipe 21 are fitted into the auxiliary receiver fitting portion 10, and thus, the mounting operation of the oil tank 1 is easy. As shown in FIG. 2~FIG. 4, to facilitate further the mounting operation of the oil tank 1 onto the bracket 2, chamfer portions 20b', 20c' are formed at the top ends of the arms 20b, 20c so that the chamfer portions 20b', 20c' recede from the oil tank 1 as getting near to its top end.

To dismount the oil tank 1 out of the bracket 2, the lower end of the lock member 10 should be displaced away from the oil tank 1 to disengage the locking of the lock member 10 out of the catch portion 11, and then the oil tank 1 should be pulled upward out of the bracket 2. As shown in FIG. 1, spacings d is defined between each side edges of the opening 12 and lock member 10. The spacings d receive a tool for pulling the lock member 10 away from the oil tank 1 to disengage the locking of the lock member 10 out of the catch portion 11. When the tank 1 is pulled upward at a certain force or more, the arms 20b, 20c are forced to widen their mutual distance by the oil outlet pipe 21, and then the oil outlet pipe 21 is released out of the auxiliary receiver fitting portion 20.

As shown in FIG. 3, the angle θ between the inner surface of the side plate 3 and the top surface of the bottom plate 4 is slightly smaller than 90°. The external circumference of the oil tank 1 and the bottom surface of the oil tank 1 make a right angle. Such an arrangement causes the top surface of the bottom plate 4 to be pressed against the bottom of the oil tank 1 mounted onto the bracket 2. The vibration of the oil tank 1 with respect to the bottom plate 4 is thus effectively prevented.

Figure 8:
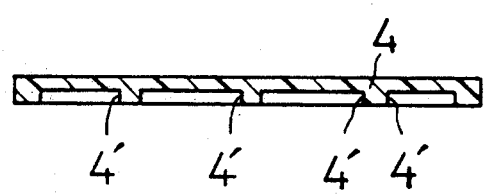
FIG. 8 is a cross-sectional view taken along line VIII—VIII in FIG. 2.

A pair of ribs 15 are formed at the joining portion between the side plate 3 and the bottom plate 4. As shown in FIG. 7 and FIG. 8, a plurality of recess portions 4' is formed on the bottom side of the bottom plate 4 in order to lighten the mass of the bracket 2. The recess portions 4' are not formed on the edge area of the bottom plate 4, in other words the edge area of the bottom plate 4 is thickened for reinforcement.

Figure 11:
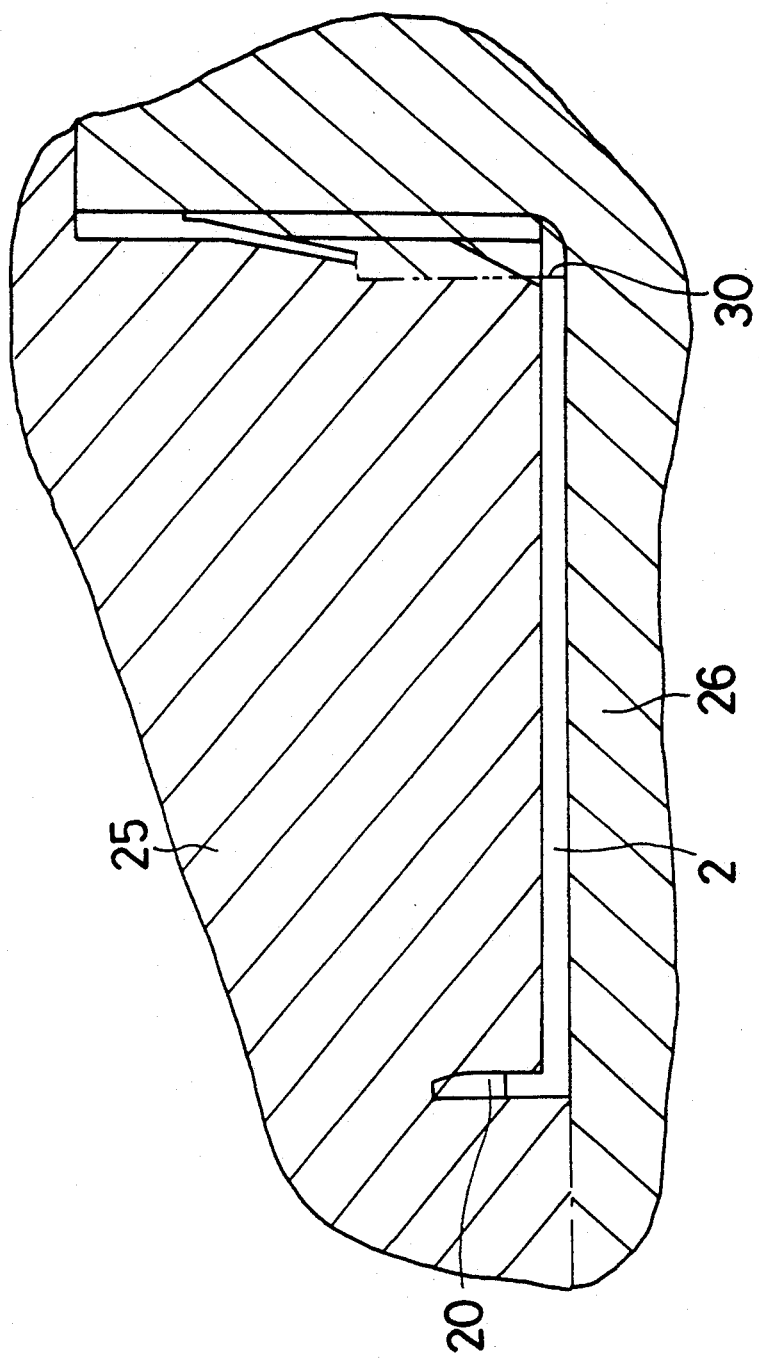
FIG. 11 shows molds used for the bracket of the first embodiment according to the present invention.
Figure 12:
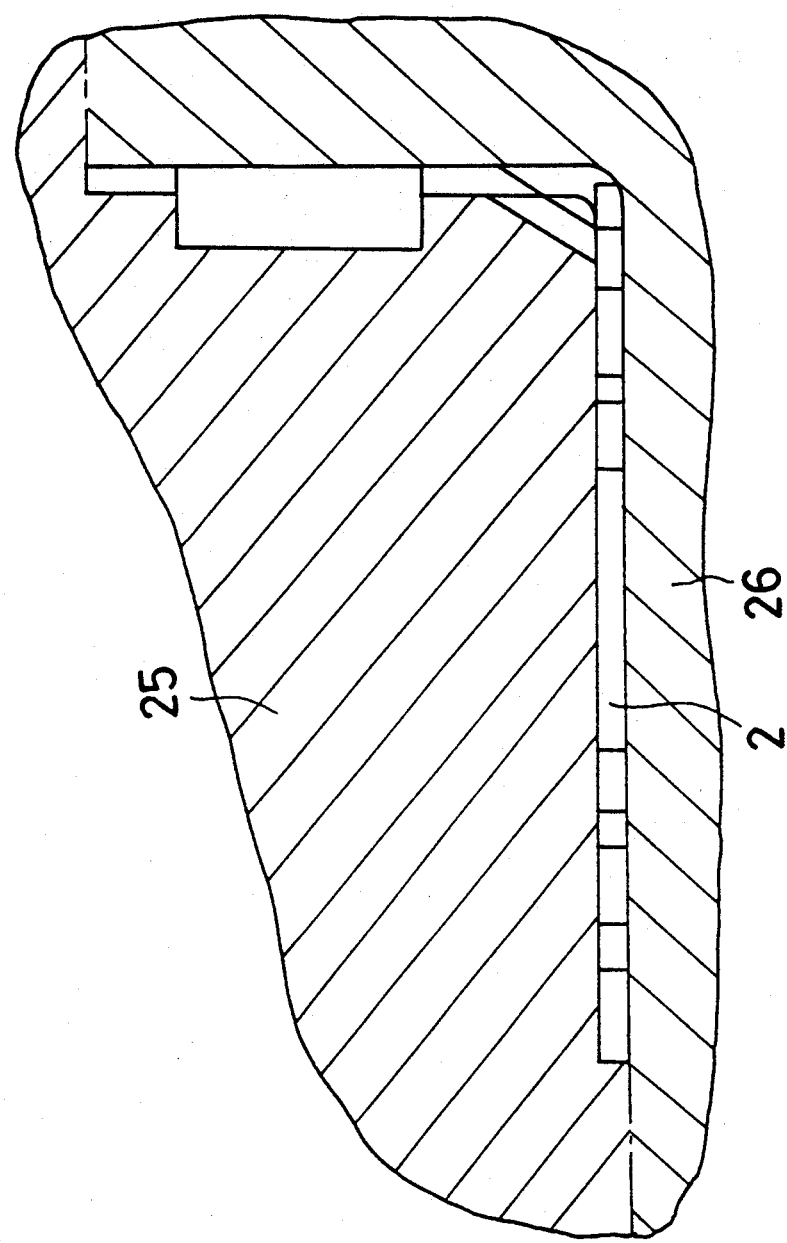
FIG. 12 shows molds used for the bracket of the first embodiment according to the present invention.
Figure 13:
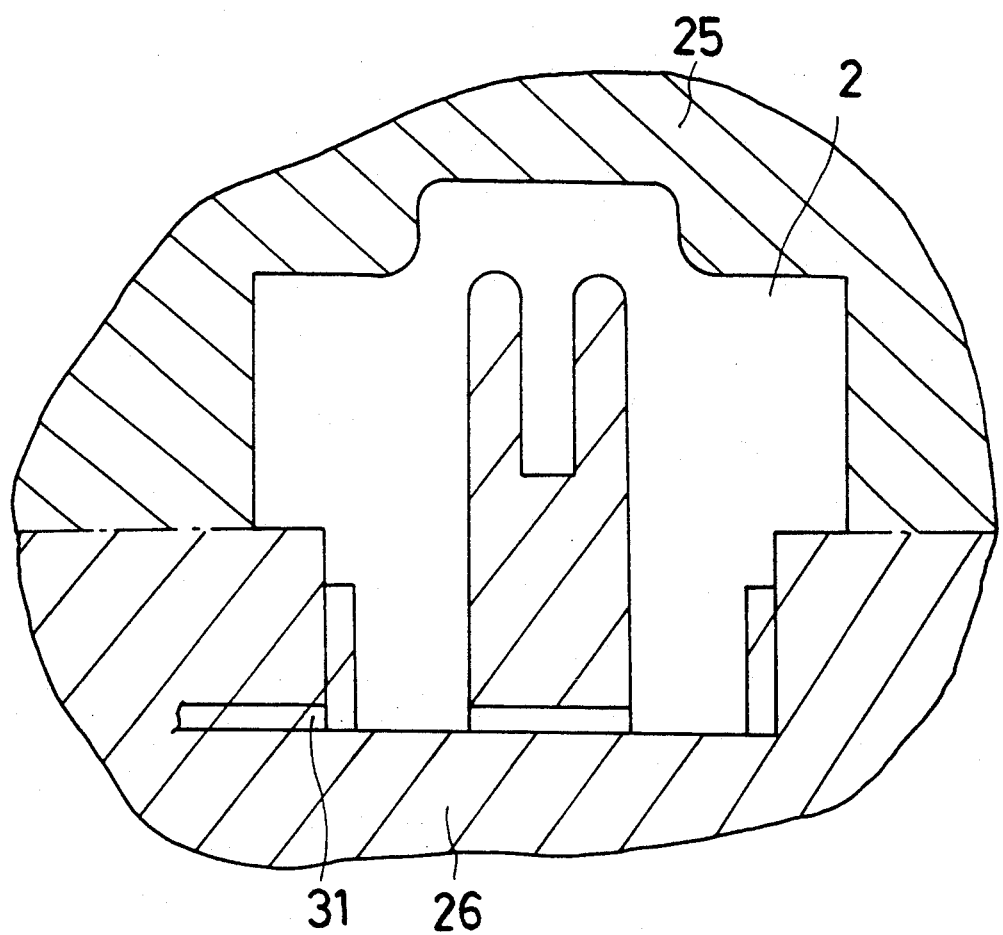
FIG. 13 shows molds used for the bracket of the first embodiment according to the present invention.

The bracket 2 is fabricated by a single injection molding operation inside a combination mold of a stationary mold and a single movable mold. In FIG. 11 through FIG. 13, hatched portions indicate a stationary mold 25 and a movable mold 26. Mold opening is performed by removing the movable mold 26 downward with respect to the stationary mold 25. A through hole 30 and a through cutout 31 are formed on the bottom plate 4 so that the bracket 2 may not interfere with the movable mold 26 during mold opening operation. The arms 20b, 20c of the auxiliary receiver fitting portion 20 are forced to widen their mutual distance by the stationary mold 25, when the bracket 2 is pulled downward with respect to the stationary mold 25 after the mold opening operation, and thus, the bracket 2 can be pulled out of the stationary mold 25.

Figure 14:
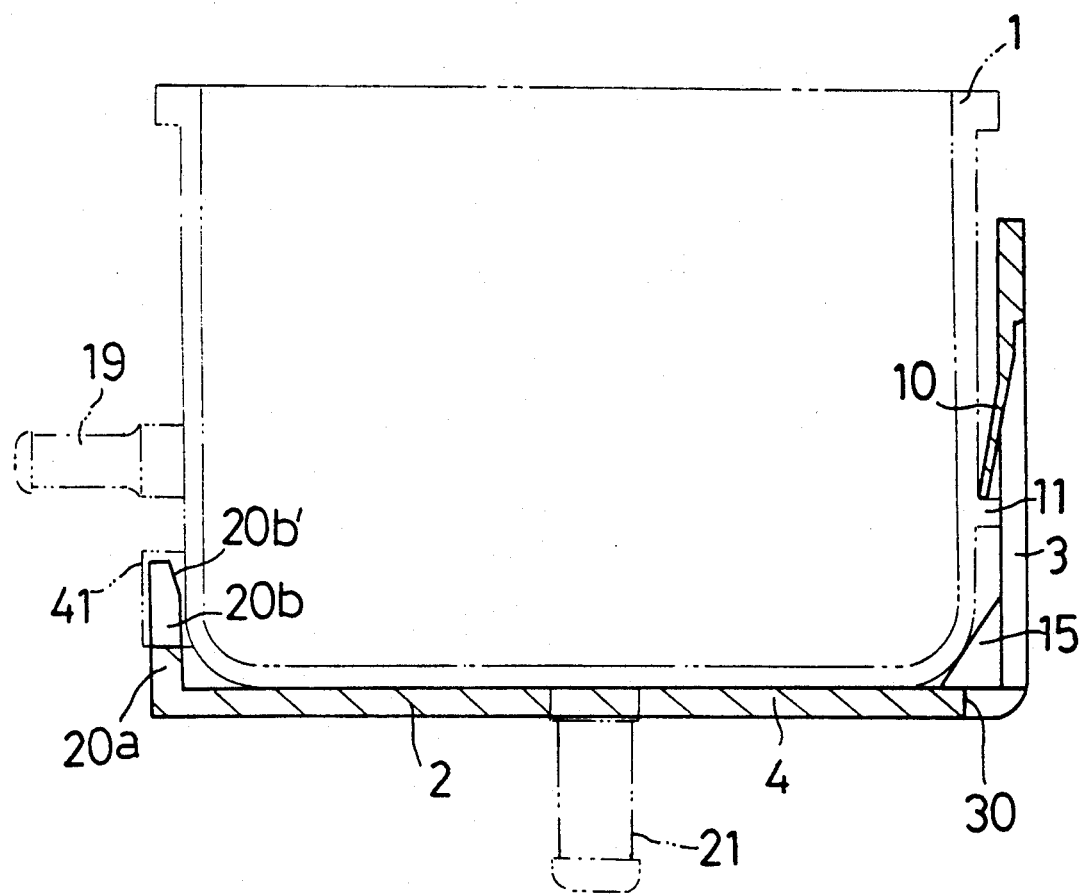
FIG. 14 is a cross-sectional view showing the bracket of the second embodiment according to the present invention.
Figure 15:
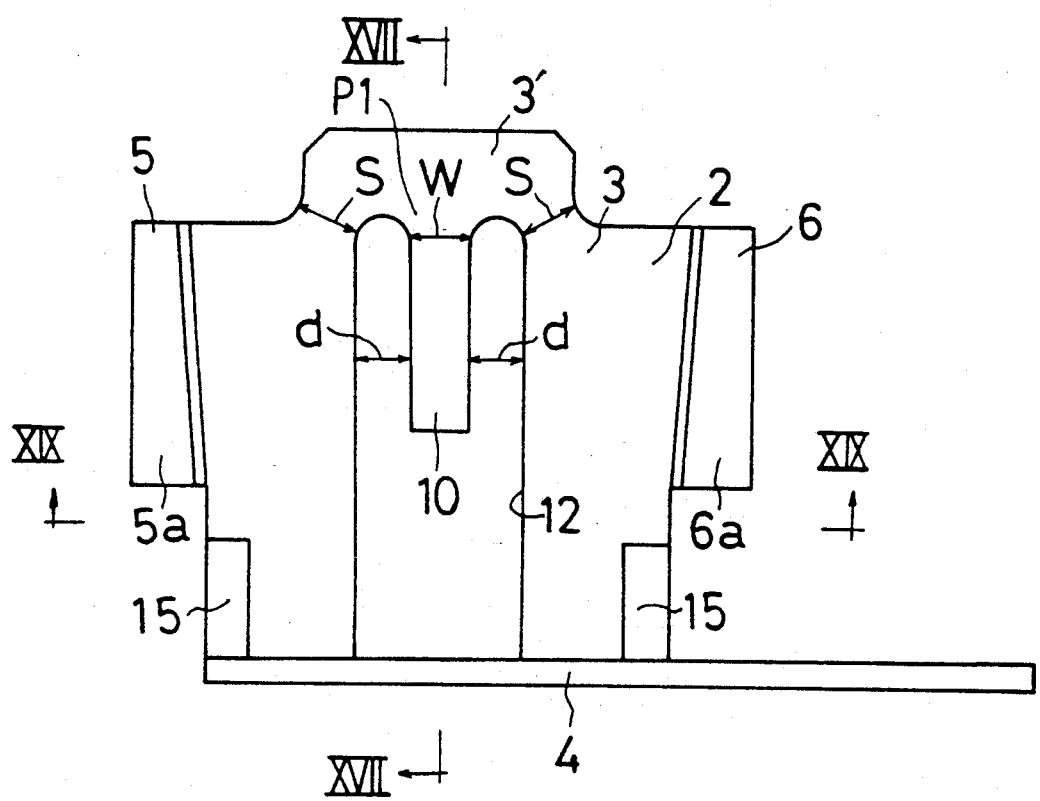
FIG. 15 is a side view showing the bracket of the third embodiment according to the present invention.
Figure 16:
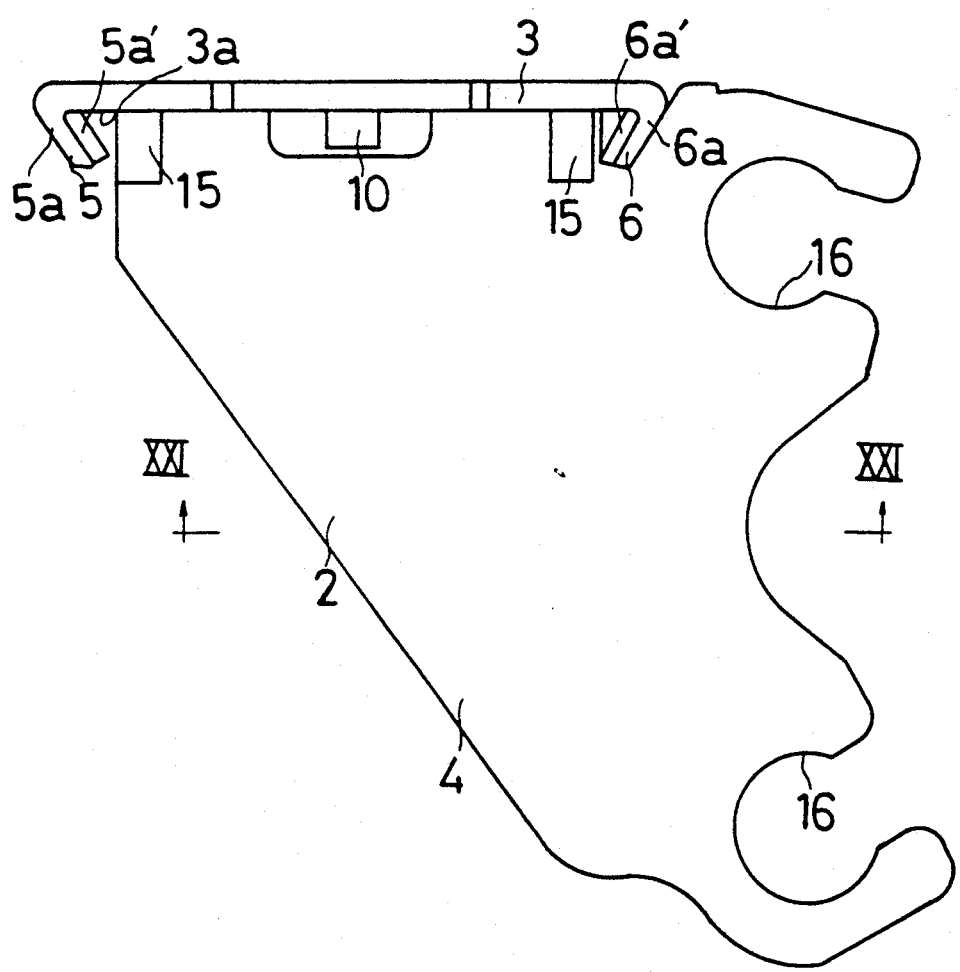
FIG. 16 is a plan view showing the bracket of the third embodiment according to the present invention.
Figure 17:
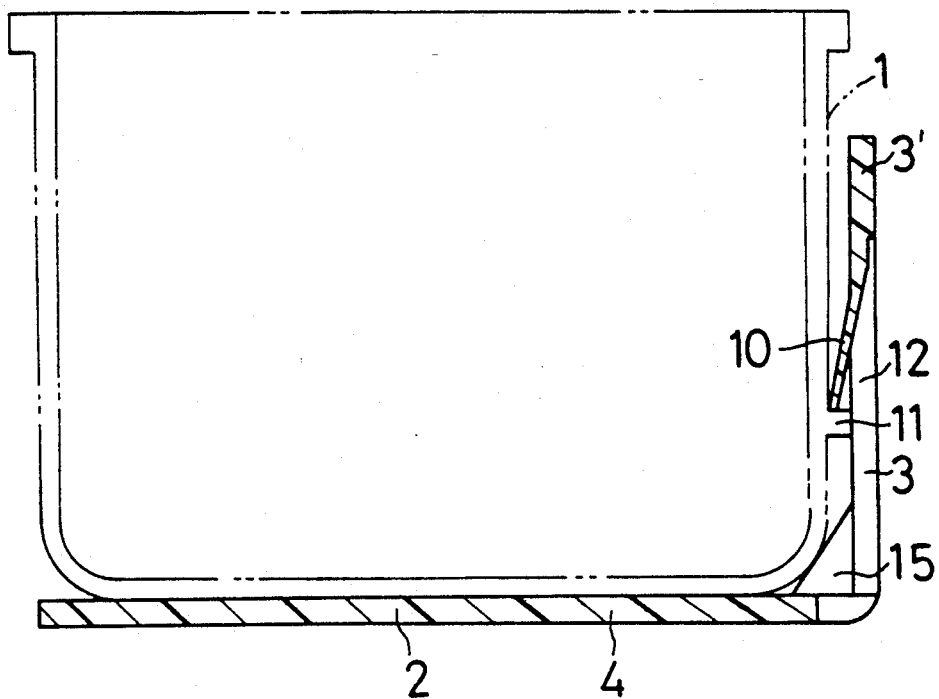
FIG. 17 is a cross-sectional view taken along line XVII—XVII in FIG. 15.
Figure 18:
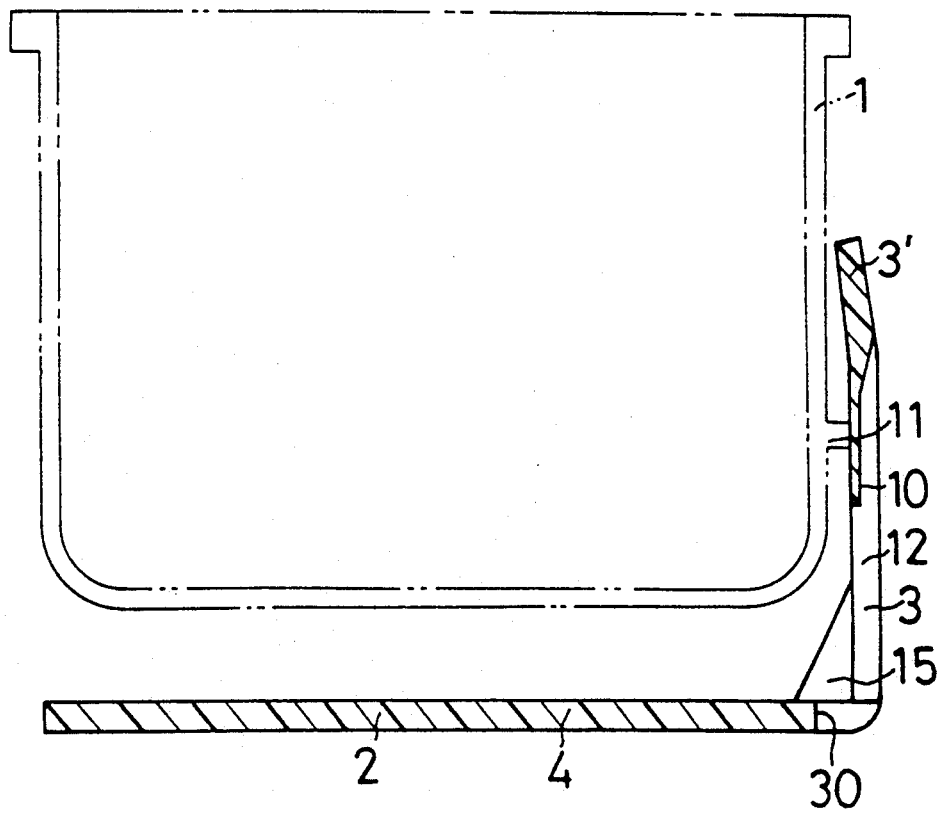
FIG. 18 is a cross-sectional view showing the function of the third embodiment of the present invention.
Figure 19:
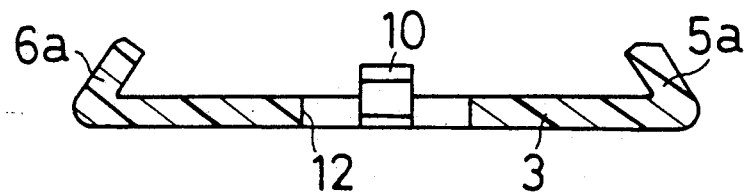
FIG. 19 is a cross-sectional view taken along line XIX—XIX in FIG. 15.
Figure 20:
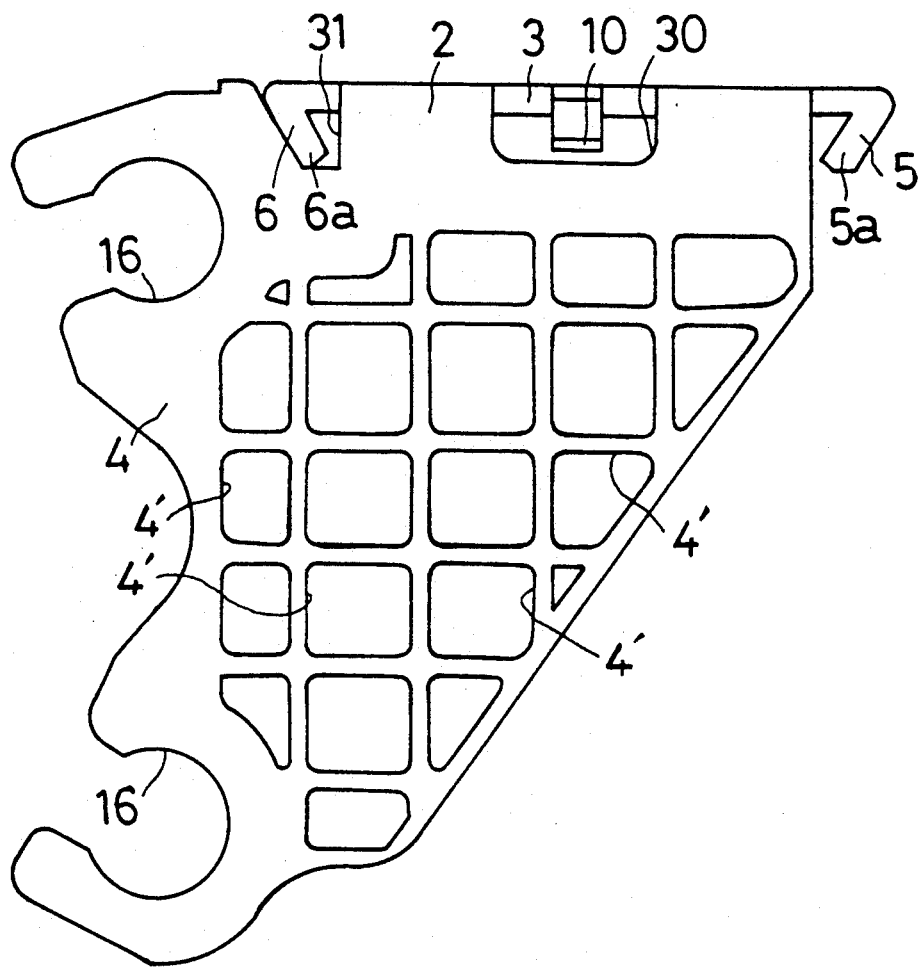
FIG. 20 is a bottom view of the bracket of the third embodiment according to the present invention.
Figure 21:
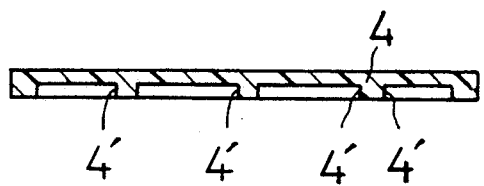
FIG. 21 is a cross-sectional view taken along line XXI—XXI in FIG. 16.
Figure 22:
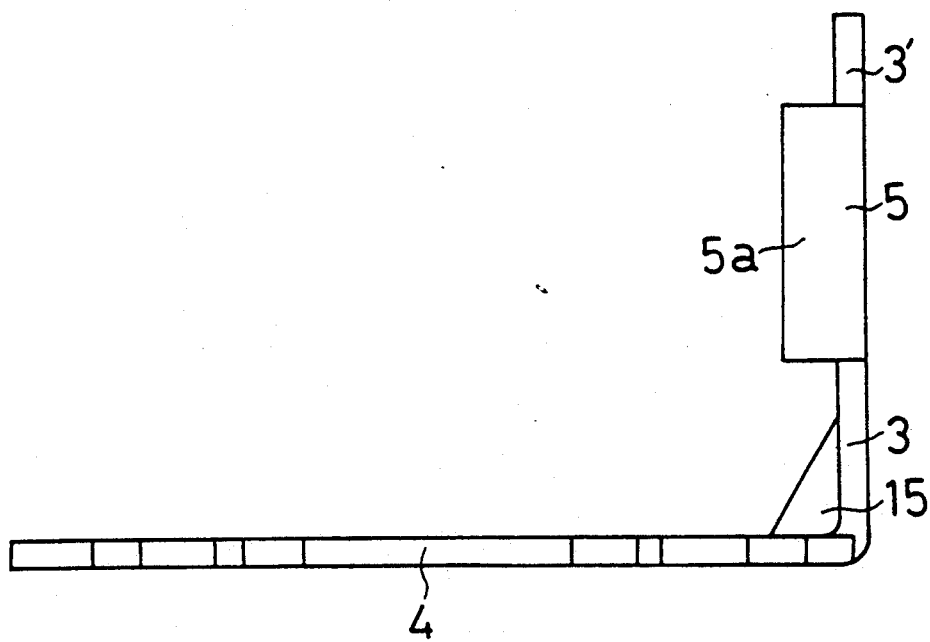
FIG. 22 is a side view of the bracket of the third embodiment according to the present invention.
Figure 23:
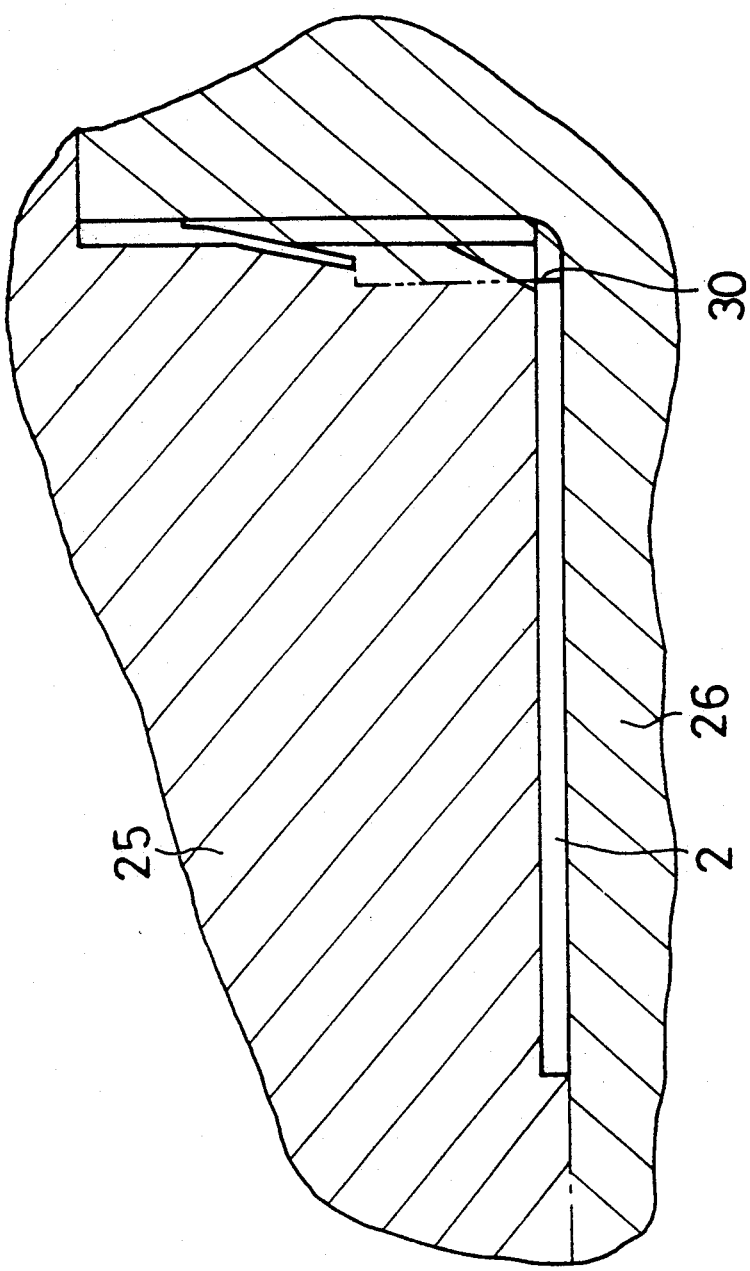
FIG. 23 shows molds used for the bracket of the third embodiment according to the present invention.
Figure 24:
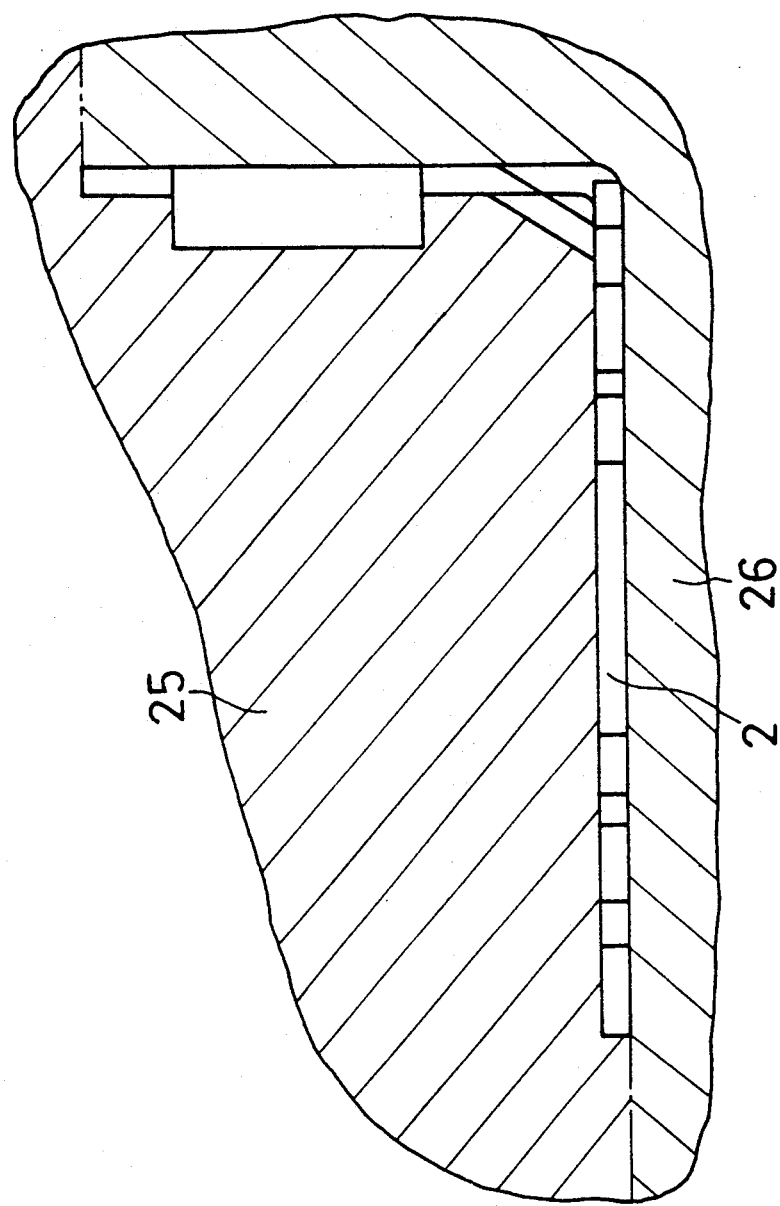
FIG. 24 shows molds used for the bracket of the third embodiment according to the present invention.
Figure 25:
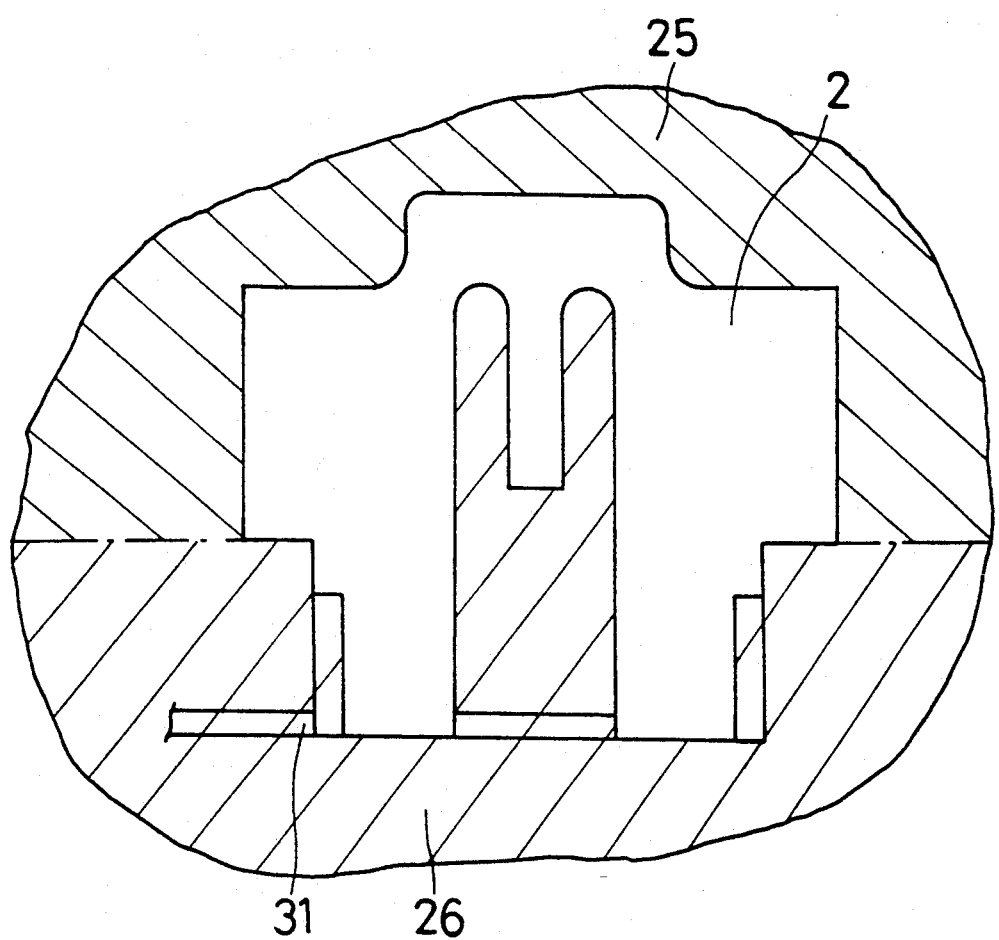
FIG. 25 shows molds used for the bracket of the third embodiment according to the present invention.
Figure 26:
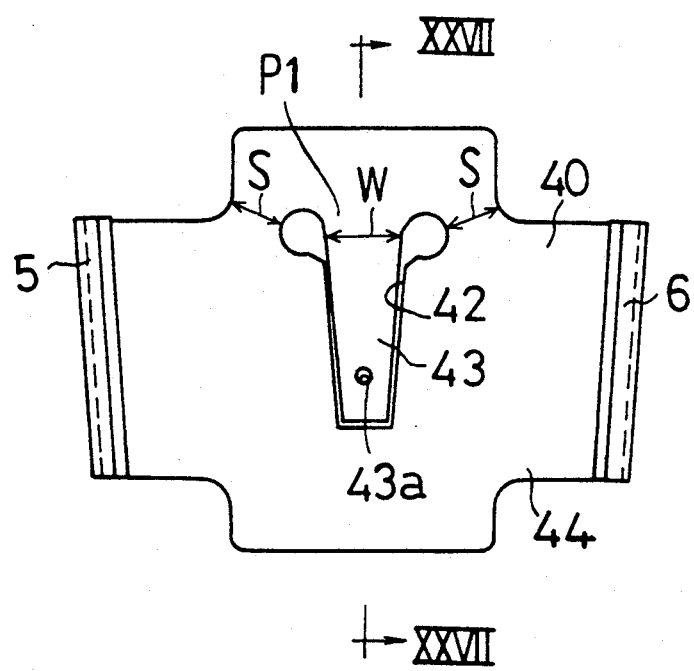
FIG. 26 is a front view showing the bracket of the fourth embodimemt of the present invention.
Figure 27:
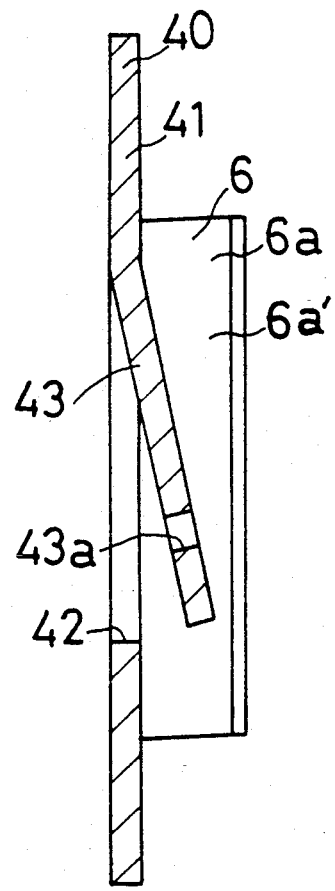
FIG. 27 is a cross-sectional view taken along XXVII—XXVII in FIG. 26.
Figure 28:
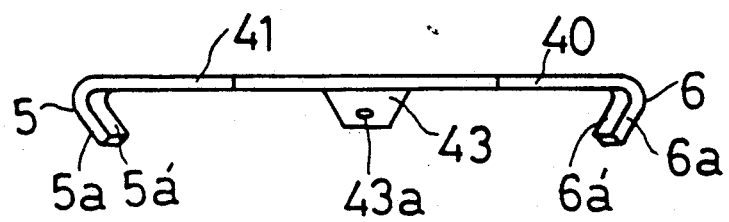
FIG. 28 is a plan view showing the bracket of the fourth embodiment according to the present invention.
Figure 29:
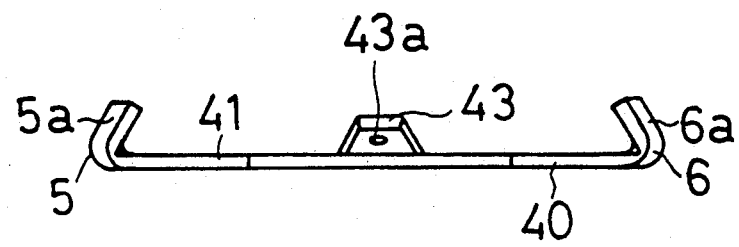
FIG. 29 is a bottom view showing the bracket of the forth embodiment according to the present invention.

The present invention is not limited to the above embodiment. For instance, while in the above embodiment the oil outlet pipe 21 is used as the auxiliary insert fitting portion, alternatively, the oil inlet pipe 19 may be used as the auxiliary insert fitting portion. Also, in case of the oil outlet pipe 21 is provided on the bottom portion of the tank 1 as shown in FIG. 14, a cylindrical projection 41 may be formed onto the external circumference of the oil tank 1, and the projection 41 may be used as the auxiliary insert fitting portion to be fitted into the auxiliary receiver fitting portion 20. FIG. 15 through FIG. 25 show another embodiment. This embodiment differs from the above embodiments in that neither auxiliary insert fitting portion 21 nor auxiliary receiver fitting portion 20 are employed. The rest of the structure is identical to the embodiment illustrated in FIG. 1 through FIG. 13. Thus, this embodiment shown in FIG. 15 through FIG. 25 employs the same reference numerals as the above embodiment employs, to denote equivalent features and to omit explanation of the equivalent features. The present invention may also be applied to a case in which the oil tank 1 is supported by a bracket 40 illustrated in FIG. 26 through FIG. 29. The bracket 40 is of metal material, and comprises a side plate 44, having no bottom plate unlike the above embodiments. A lock member 43 is integrally formed with the side plate 44 by forming an opening 42 on the side plate 44. The lock member 43 is supported like a cantilever by the side plate 44 at the upper edge of the opening 44. The lock member 43 has a through hole 43a for a tool. The oil tank 1 is dismountable upward out of the bracket 40 with the tool inserted into the through hole 43a, by pulling the lock member 43 away from the oil tank 1 (to the left in FIG. 27) to disengage the locking of the lock member 43 out of the catch portion 11. The through hole 43a may have open-ended at its bottom instead of a closed hole as shown in FIG. 26. The rest of the structure is identical to the embodiment illustrated in FIG. 1 through FIG. 13. This embodiment employs the same reference numerals as the above embodiment employs to denote equivalent features. While in the above embodiments are applied to the oil tank support structure for the hydraulic power steering device, the present invention may alternately be applied to any other type of structure which supports a reservoir by a bracket.

What is claimed is:

1. A reservoir supporting structure comprising a bracket which supports a reservoir having an external circumference, the bracket having a side plate which faces the external circumference of the reservoir, a receiver fitting portion which is formed onto the side plate, an insert fitting portion which is formed onto the reservoir, the reservoir being supported by the bracket by fitting of the insert fitting portion from above into the receiver fitting portion, an opening which is formed on the side plate, a lock member which is supported like a cantilever by the side plate at the upper edge of the opening, the lock member being elastically displaceable so as to be able to recede from the reservoir, a catch portion which is formed onto the reservoir, the catch portion forcing the lock member to displace elastically so that the lock member recedes from the reservoir in the course of fitting of the insert fitting portion into the receiver fitting portion, the side plate being elastically deformable in company with the elastic displacement of the lock member, wherein the lock member comes close to the reservoir to recover its original position and is placed on the top of the catch portion to prevent the upward accidental dismount of the reservoir out of the bracket when the fitting operation is completed.

2. The reservoir supporting structure according to claim 1, in which a spacing is defined between the side edge of the opening so as to receive a tool for pulling the lock member away from the reservoir.

3. The reservoir supporting structure according to claim 1, in which the bracket has a bottom plate, is of synthetic plastic material, and can be fabricated inside a combination mold of a stationary mold and a single movable mold.

4. The reservoir supporting structure according to claim 2, in which the bracket has a bottom plate, is of synthetic plastic material, and can be fabricated inside a combination mold of a stationary mold and a single movable mold.

5. The reservoir supporting structure according to claim 1, in which the bracket has a bottom plate facing the bottom of the reservoir and an auxiliary receiver fitting portion formed onto the bottom plate, and in which an auxiliary insert fitting portion is formed onto the reservoir, and the auxiliary insert fitting portion is fitted from above into the auxiliary receiver fitting portion, wherein the upward accidental release of the auxiliary insert fitting portion out of the auxiliary receiver fitting portion is preventable when the fitting operation is completed.

6. The reservoir supporting structure according to claim 2, in which the bracket has a bottom plate facing the bottom of the reservoir and an auxiliary receiver fitting portion formed onto the bottom plate, and in which an auxiliary insert fitting portion is formed onto the reservoir, and the auxiliary insert fitting portion is fitted from above into the auxiliary receiver fitting portion, wherein the upward accidental release of the auxiliary insert fitting portion out of the auxiliary receiver fitting portion is preventable when the fitting operation is completed.

7. The reservoir supporting structure according to claim 5, in which the reservoir is a fluid tank with a pipe projected from the circumference of the fluid tank for allowing a fluid to pass through, and the pipe is used as the auxiliary insert fitting portion.

8. The reservoir supporting structure according to claim 6, in which the reservoir is a fluid tank with a pipe projected from the circumference of the fluid tank for allowing a fluid to pass through, and the pipe is used as the auxiliary insert fitting portion.

9. The reservoir supporting structure according to claim 5, in which the angle between the inner surface of the side plate and the top surface of the bottom plate is smaller than the angle between the external circumference of the reservoir and the bottom surface of the reservoir.

10. The reservoir supporting structure according to claim 6, in which the angle between the inner surface of the side plate and the top surface of the bottom plate is smaller than the angle between the external circumference of the reservoir and the bottom surface of the reservoir.

11. The reservoir supporting structure according to claim 7, in which the angle between the inner surface of the side plate and the top surface of the bottom plate is smaller than the angle between the external circumference of the reservoir and the bottom surface of the reservoir.

12. The reservoir supporting structure according to claim 8, in which the angle between the inner surface of the side plate and the top surface of the bottom plate is smaller than the angle between the external circumference of the reservoir and the bottom surface of the reservoir.

13. A reservoir supporting structure comprising a bracket which supports a reservoir having an external circumference, the bracket having a side plate which faces the external circumference of the reservoir and a bottom plate which faces the bottom of the reservoir, a receiver fitting portion which is formed onto the side plate, a insert fitting portion which is formed onto the reservoir, the reservoir being supported by the bracket by fitting of the insert fitting portion from above into the receiver fitting portion, an auxiliary receiver fitting portion which is formed onto the bottom plate, an auxiliary insert fitting portion which is formed onto the reservoir, the auxiliary insert fitting portion being fitted from above into the auxiliary receiver fitting portion, wherein the upward accidental release of the auxiliary insert fitting portion out of the auxiliary receiver fitting portion is preventable when the fitting operation is completed.

14. The reservoir supporting structure according to claim 13, in which the reservoir is a fluid tank with a pipe projected from the circumference of the fluid tank for allowing a fluid to pass through, and the pipe is used as the auxiliary insert fitting portion.

15. The reservoir supporting structure according to claim 13, in which the angle between the inner surface of the side plate and the top surface of the bottom plate is smaller than the angle between the external circumference of the reservoir and the bottom surface of the reservoir.

16. The reservoir supporting structure according to claim 14, in which the angle between the inner surface of the side plate and the top surface of the bottom plate is smaller than the angle between the external circumference of the reservoir and the bottom surface of the reservoir.

17. The reservoir supporting structure according to claim 13, in which the bracket is of synthetic plastic material, and can be fabricated inside a combination mold of a stationary mold and a single movable mold.

18. The reservoir supporting structure according to claim 14, in which the bracket is of synthetic plastic material, and can be fabricated inside a combination mold of a stationary mold and a single movable mold.

19. The reservoir supporting structure according to claim 15, in which the bracket is of synthetic plastic material, and can be fabricated inside a combination mold of a stationary mold and a single movable mold.

20. The reservoir supporting structure according to claim 16, in which the bracket is of synthetic plastic material, and can be fabricated inside a combination mold of a stationary mold and a single movable mold.

* * * * *